US009671521B2

(12) United States Patent
Louchard

(10) Patent No.: US 9,671,521 B2
(45) Date of Patent: Jun. 6, 2017

(54) METHOD AND SYSTEM FOR BURIED LAND MINE DETECTION THROUGH DERIVATIVE ANALYSIS OF LASER INTERFEROMETRY

(71) Applicant: BAE Systems Information and Electronic Systems Integration Inc., Nashua, NH (US)

(72) Inventor: Eric M. Louchard, Miami, FL (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/800,145

(22) Filed: Jul. 15, 2015

(65) Prior Publication Data

US 2016/0054270 A1 Feb. 25, 2016

Related U.S. Application Data

(60) Provisional application No. 62/024,696, filed on Jul. 15, 2014.

(51) Int. Cl.
*G01N 29/24* (2006.01)
*G01V 8/12* (2006.01)
*G01V 1/28* (2006.01)
*G01V 1/22* (2006.01)

(52) U.S. Cl.
CPC ............ *G01V 8/12* (2013.01); *G01V 1/226* (2013.01); *G01V 1/28* (2013.01); *G01V 2210/121* (2013.01); *G01V 2210/48* (2013.01)

(58) Field of Classification Search
CPC ......... G01N 29/2418; G01V 8/00; G01V 8/02

USPC .......................................................... 356/502
See application file for complete search history.

(56) References Cited

U.S. PATENT DOCUMENTS

| 8,797,828 | B1 * | 8/2014 | Lev | G01V 8/00 356/486 |
| 2007/0091316 | A1 * | 4/2007 | Lal | G01H 9/002 356/486 |
| 2008/0007715 | A1 * | 1/2008 | Meldahl | G01H 9/00 356/72 |
| 2014/0079296 | A1 * | 3/2014 | Cleland | G06F 21/32 382/117 |

OTHER PUBLICATIONS

E.M Louchard et al., "Derivative Analysis of Absorption Features in Hyperspectral Remote Sensing Data of Carbonate Sediments", Opt. Express 10, 2002.
W.L. Butler et al., "Higher Derivative Analysis of Complex Absorption Spectra", Photochem. Photobio. 12, pp. 439-450,1970.
T.H. Demetriades-Shah, M.D. et al., "High Resolution Derivative Spectra in Remote Sensing", Remote Sens. Environ. 33, pp. 55-64, 1990.

(Continued)

*Primary Examiner* — Jonathan Hansen
(74) *Attorney, Agent, or Firm* — Davis & Bujold, PLLC

(57) ABSTRACT

A method of detecting land mines includes pre-processing a raw laser interferometer image, processing pre-processed image by calculating one or more derivatives having one or more peaks, along vectors extending in at least two different directions, mapping the peaks of said derivatives to create a derivative map, and detecting an anomalous signature in the derivative map.

8 Claims, 6 Drawing Sheets

(56) References Cited

OTHER PUBLICATIONS

P.J. Curren et al., "Reflectance Spectroscopy of Fresh Whole Leaves for the Estimation of Chemical Concentration", Remote Sens. Environ. 39, pp. 153-166, 1992.

A. Palacios-Orueta et al., "Remote Sensing of Soil Properties in the Santa Monica Mountains I. Spectral Analysis", Remote Sens. Environ, 65, pp. 170-183, 1998 (c) 2002 OSA Dec. 30, 2002/vol. 10, No. 26/Optics Express 1573 #1802.

E.M. Rolllin et al., "Processing of High Spectral Resolution Reflectance Data for the Retrieval of Canopy Water Content Information", Remote Sens. Environ. 65, pp. 86-92, 1998.

R.F. Kokaly et al., "Spectroscopic Determination of Leaf Biochemistry Using Band-Depth Analysis of Absorption Features and Stepwise Multiple Linear Regression", Remote Sens. Environ. 67, pp. 267-287, 1999.

\* cited by examiner

METHOD AND SYSTEM FOR BURIED LAND MINE DETECTION THROUGH DERIVATIVE ANALYSIS OF LASER INTERFEROMETRY

This application claims benefit of provisional application No. 62/024,696, filed Jul. 15, 2014.

STATEMENT OF GOVERNMENT INTEREST

This invention was made with United States Government support under Contract No. N00014-07-C-0292 awarded by Office of Naval Research (ONR) US Navy. The United States Government has certain rights in this invention.

BACKGROUND OF THE INVENTION

Field of the Invention

The present invention relates to mine detection, and specifically, to mine detection through laser interferometry.

Brief Description of Related Art

Buried land mines present themselves as interference fringe patters when insonified and imaged by a laser interferometer system. The indistinct nature of the patterns has made them a challenge to indemnify consistently with automated detection algorithms so they typically have been identified by visual analysis of the digital imagery. To fully exploit laser interferometer imagery within an operational system requires a means of automatically detecting these patterns.

Automatic detection of the interference signatures produced by buried mines present multiple challenges. Ordinary approaches to automated target detection are confounded by the distributed nature of the target signature and variations related to target materials, structure, and burial depth. Furthermore, target signatures often have low signal to noise ratio (SNR), embedded in a grainy background caused by laser speckle, so anomaly detection algorithms that are based on SNR of a distinct target shape may not detect them.

Derivative analysis is often utilized in spectroscopic research as it can help identify minute fluctuations in the shape of hyperspectral signatures. For example, peaks in the $2^{nd}$ derivative of a reflectance spectrum can be used to identify specific absorption regions caused by biological pigments, paints, materials properties or any other feature that affects reflectance. The idea for the derivative peak detection algorithm originated from spectroscopy, but takes the concept and applies it to vectors of pixel intensity instead of spectral reflectance. Variations in intensity along the pixel vector are translated into a derivative spectrum that shows the location of the most rapid changes, similar to how the derivative of a reflectance spectrum shows the locations where reflectance changes rapidly due to pigment or material absorption.

The existing art all suffers from the defect that buried mines produce a unique pattern of parallel lines that varies in shape and intensity, making it difficult to detect using spectral or shape-based detections.

SUMMARY OF THE INVENTION

The present method employs a derivative calculation that measures the changes in intensity in vectors in the row and column direction, rather than detecting shape. Regions with rapid changes in intensity, such as edges or dark lines, create a peak in the derivative vector. Patterns of parallel lines from buried mines therefore create a cluster of derivative peaks that appear anomalous compared to the rest of the image. The present method does not rely on the shape of the signature; it only looks for patterns of rapid changes in light and darkness form parallel lines. This makes it effective when the signatures of buried mines are not in the expected butterfly pattern or if they are larger or smaller than expected. Either of those cases causes difficulty for traditional shape-based or intensity-based anomaly detectors.

The present method utilizes a derivative algorithm that detects the mine signatures by examining alternating patterns of higher and lower intensity in the interference signature using a derivative peak detection routine, identifying the most anomalous regions with the highest number derivative peaks within an expected, mine-sized area. This technique avoids the problem of trying to match the mine interference pattern to an expected of size and shape and simply examines the number and spacing of bright and dark regions within the patterns. This algorithm can significantly improve mine detection in laser interferometer imagery by fully automating the detection and clutter-rejection process.

This algorithm solves the complex problem of identifying targets that present as indistinct shapes in interferometer imagery. The algorithm enhances imagery by focusing on regions with coherent patterns while masking out uniform regions. A deceptively simple function, the algorithm may have applications beyond buried mine detection and may have application to any routine that examines imagery with wave patterns. It is well-suited for use as a primary or secondary algorithm within a detection suite, complimenting other types of detection algorithms such as local-block anomaly detectors, edge detectors or masked tilters.

BRIEF DESCRIPTION OF THE DRAWINGS

The invention is further described with reference to the accompanying drawings wherein.

DETAILED DESCRIPTION OF THE INVENTION

Figure 6:
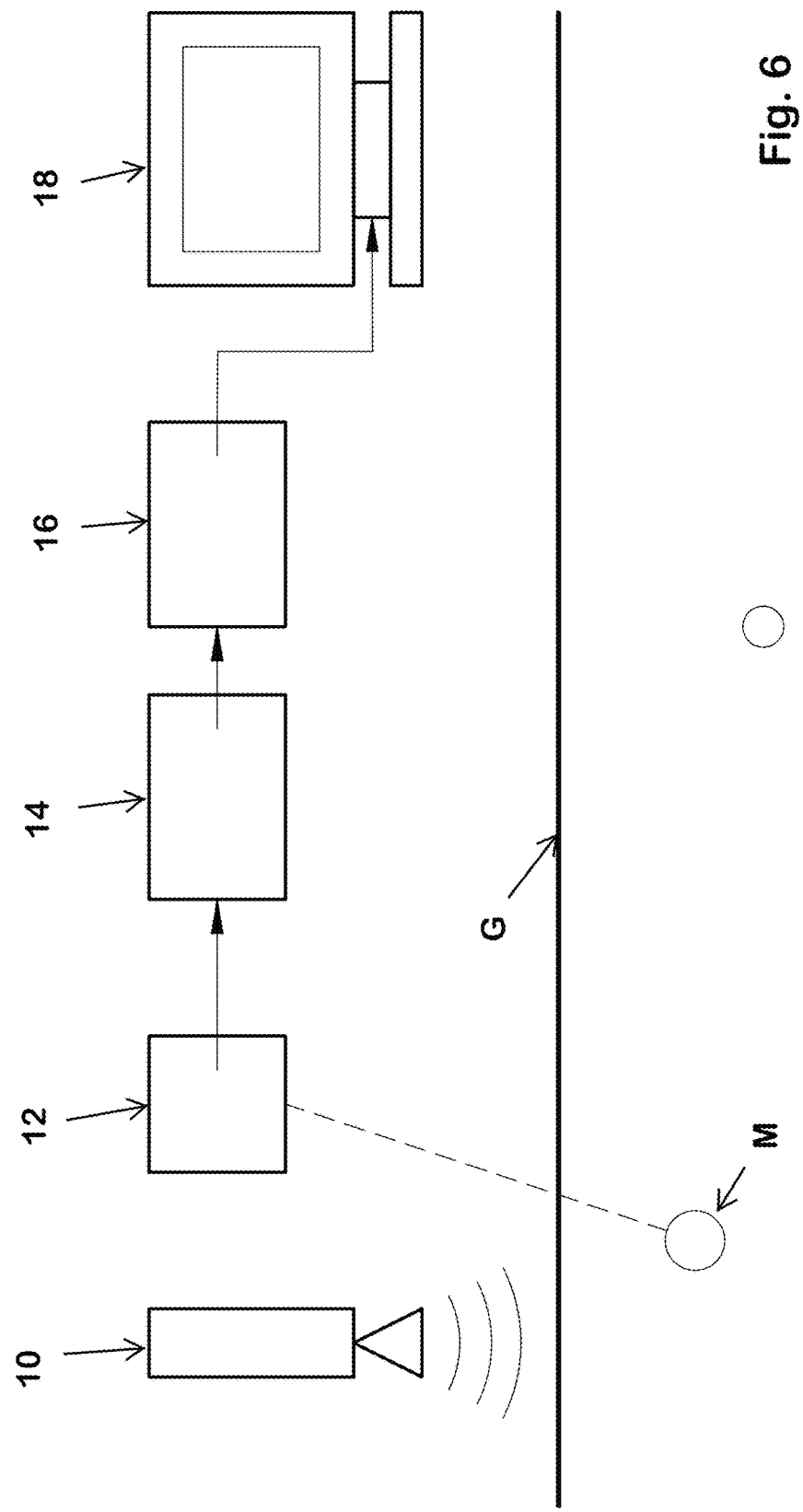
FIG. 6 is a diagram of the components of the system.

To locate buried objects such as land mines, ground overlying the objects is insonified and an image of the ground is formed using laser interferometry. Suitable such methods are well known. A system for carrying out the method is illustrated in FIG. 6. A sonic source 10 is shown adjacent a laser interferometer 12, which forms a raw image of the ground, including information on buried objects. The raw image is preprocessed by a filter 14 as described below, and the resulting image is further processed at 16 to improve signal-to-noise ratio (SNR). Anomalies are identified, and displayed on the preprocessed image, for example on monitor 18 associated with a computer for performing the processing steps.

Parameters used in the derivative peak algorithm are listed in the table below:

| Variable | Type | Description |
| --- | --- | --- |
| scalefactor | Integer | Used to downsample the image and increase processing speed. It is an integer, used to scale by 1/scalefactor. |
| derivthresh | Integer | Minimum number of peaks in sum of row&column vector peaks. |
| fullkernel | Integer | Length of row and column vector, centered on the pixel under analysis. This is sealed by scalefactor to make the actual kernel size (Ksize) used in derivative calculations. |
| deriv_width | Integer | Number of pixels used in calculation of derivative, This is essentially a moving window size. |
| deriv_peakthresh | Floating Point | Minimum magnitude for derivative peak to be counted. |
| minpeak_range | Floating Point | Spacing range of rings of "butterfly pattern". This value requires some preliminary analysis of the data in order to be determined. It is scaled by the scalefactor variable. |
| maskvalue | Floating point | Pixels in the original laser interferometer image above this value are set to zero in a mask image of ones. The mask is multiplied with the Derivative Map to mask out reflective surface clutter. |
| maskfraction | Floating point | Percentage of masked area allowed within radius of fullkernal. |
| grprad | Integer | Maximum spacing between cluster pixels. |
| minpix | Integer | Minimum number of pixels for a cluster in the derivative image. |
| maxpix | Integer | Maximum number of pixels for a cluster in the derivative image. |

The first step of the method is to pre-process raw laser interferometer imagery using a Gaussian blur filter. The Gaussian kernel is created with variables for size and standard deviation (a). The equation below shows the form of a two-dimensional Gaussian.

$$g(x, y) = \frac{1}{2\pi\sigma^2} e^{-\frac{x^2+y^2}{2\sigma^2}} \quad (1)$$

where x and y are vectors with length equal to the kernel size (Ksize=(5, 5) for example). The vector values range from positive to negative (Ksize-1)/2, interpolated along the length of the vector. For Ksize=(5, 5) the x vector would be (-2 -1 0 1 2) and the y vector would be the transposed vector (-2 -1 0 1 2)'. When used in Matlab, these vectors are replicated into matrices for multiplication. Ksize should be odd to maintain symmetry in the calculation.

The Gaussian kernel is then filtered using Equation 2.

$$g(x,y)<FPA*max(g)=0 \quad (2)$$

where FPA is the floating point relative accuracy for the program being used, or the minimum distance between 1.0 and the next floating point number.

Note: MATLAB (matrix laboratory) is a multi-paradigm numerical computing environment and fourth-generation programming language. MATLAB allows matrix manipulations, plotting of functions and data, implementation of algorithms, creation of user interfaces, and interfacing with programs written in other languages, including C, C++, Java, Fortran and Python. "MATLAB" is a registered trademark of Mathworks, Inc.

Figure 1:
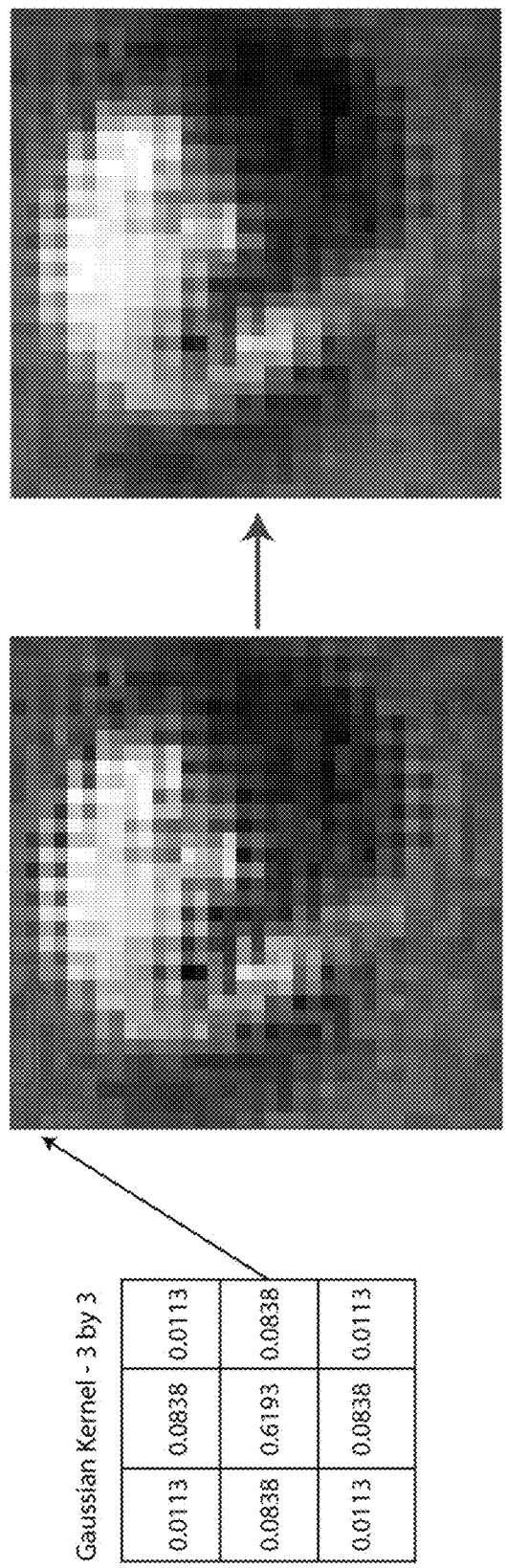
FIG. 1 is an image pre-processed through a Gaussian blur kernel.

In Matlab, the function 'eps' gives the FPA value. Once the Gaussian kernel is produced, it is applied to each pixel in the image in a stepwise manner, shifting the kernel "window", then multiplying the matrix by the pixels that fit in the window (FIG. 1).

A blur kernel must fit entirely in the image, so in order to apply it to pixels at the edge there must be a "padded" edge on the image equal to (Ksize/2-1). For example, a 5 by 5 kernel requires the image to have two pixels of padding on each side, so it ends up being four pixels larger. This padded image is temporary, and only used for processing the Gaussian blur image, which will end up being the same size as the original. Padding pixels will have the value of the nearest edge pixel of the original image.

The smoothed image can be downsampled by an amount equal to the inverse of the scalefactor parameter to help improve processing speed when analyzing multiple frames for mine detection. There are many types of interpolation algorithms for downsampling. The simplest algorithm samples each nth pixel, equal to the integer scalefactor, making it an efficient algorithm for use in FPGAs that can only load up every nth pixel.

Note: A field-programmable gate array (FPGA) is an integrated circuit designed to be configured by a customer or a designer after manufacturing. FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory.

The size of the re-sampled image in rows and columns is then rounded down to the nearest integer. If FPGA processing is not critical, one can instead use bilinear or bicubic interpolation, the default Matlab method.

The derivative algorithm is applied in a way similar to a convolution, using a moving window that acts on each pixel of the image. An important difference though, is that calculations are only done along two vectors, one along a number of rows equal to the kernel size and the other in the column direction. The first derivative is calculated along the row and column vectors using Equation 3. Higher level derivatives (Equation 4) were tested but were found to have the same results or worse due to loss of SNR for each successive calculation. They may factor into different versions of this algorithm and are shown in this document for completeness.

$$\frac{dI}{dp} = \frac{I(p_i) - I(p_j)}{p_j - p_i} \quad (3)$$

$$\frac{d^n I}{dp^n} = \frac{dI}{dp}\left(\frac{d^{(n-1)}I}{dp^{(n-1)}}\right) \quad (4)$$

In Equation 3, spacing (dp) between two points along the vector ($p_j$ and $p_i$) is an odd number (default spacing is 5 pixels) and $p_j > p_i$. Example results from the derivative calculation in the row direction are shown in FIG. 1, modified to show the absolute value of the derivative. Peaks in the absolute-value derivative spectrum are found by locating points that change from increasing to decreasing slope using the following rule:

If dI/dp(i−1)+dI/dp(i+1)≥dI/dp(i)→peak in absolute derivative vector

Figure 2:
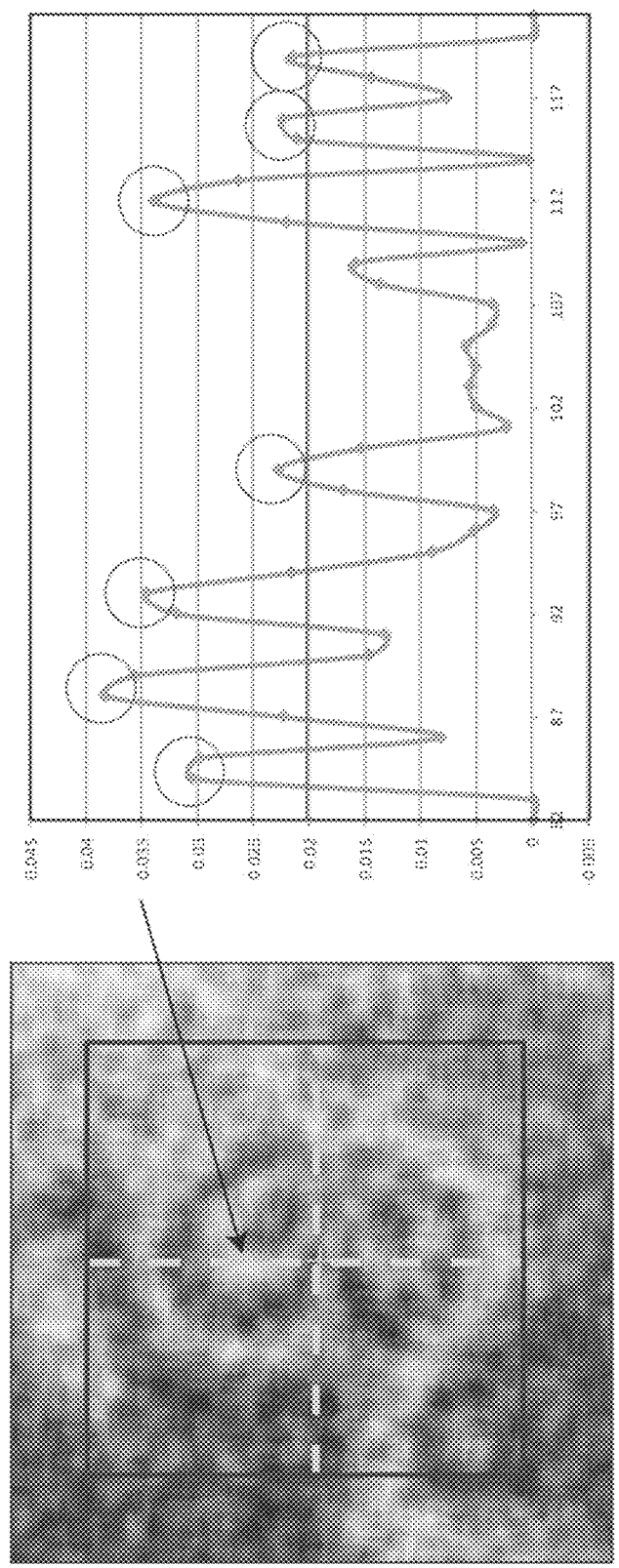
FIG. 2 is a derivative row vector of an image processed as in FIG. 1.
Figure 3:
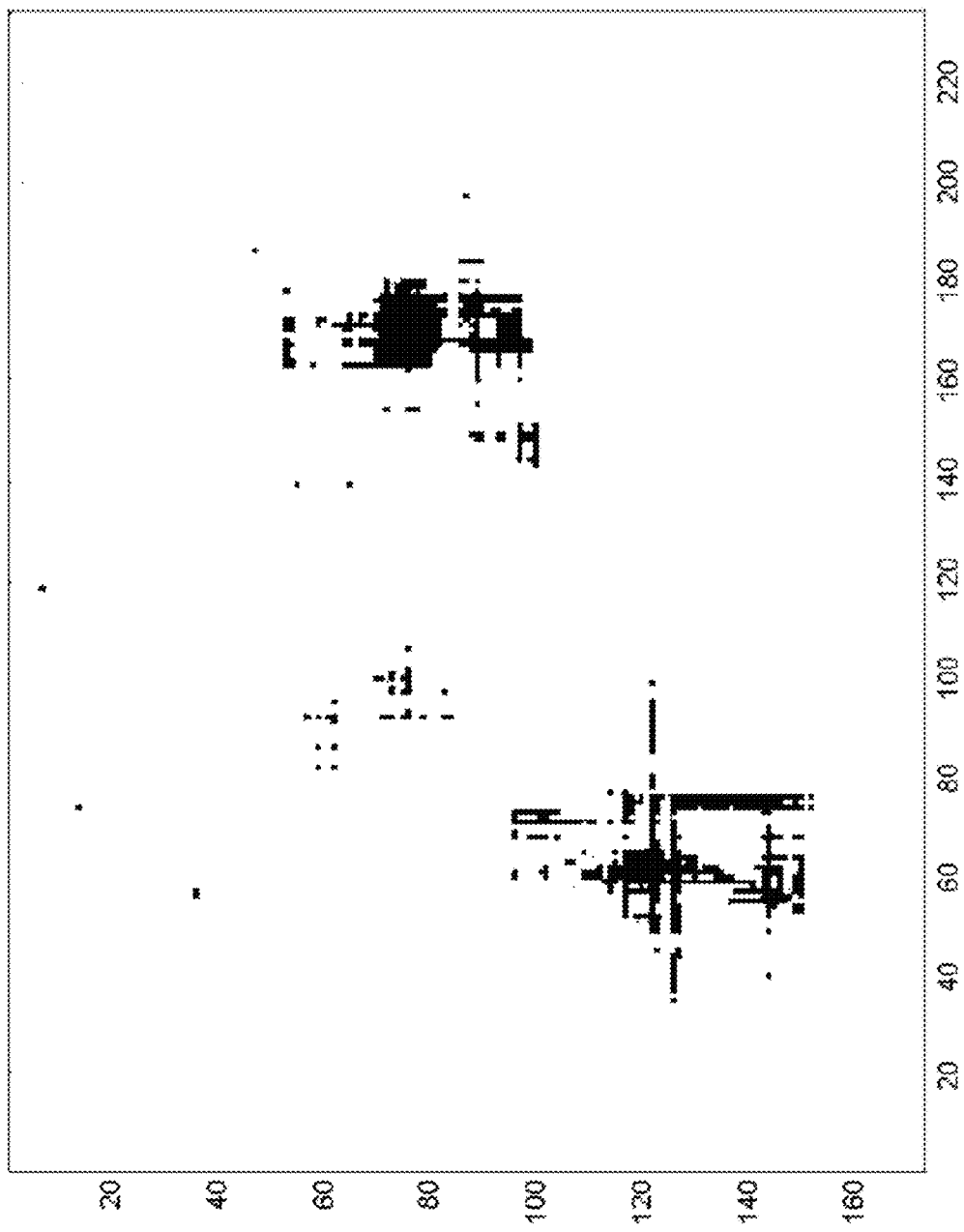
FIG. 3 is a Derivative Map of an image processed in FIG. 1.
Figure 4:
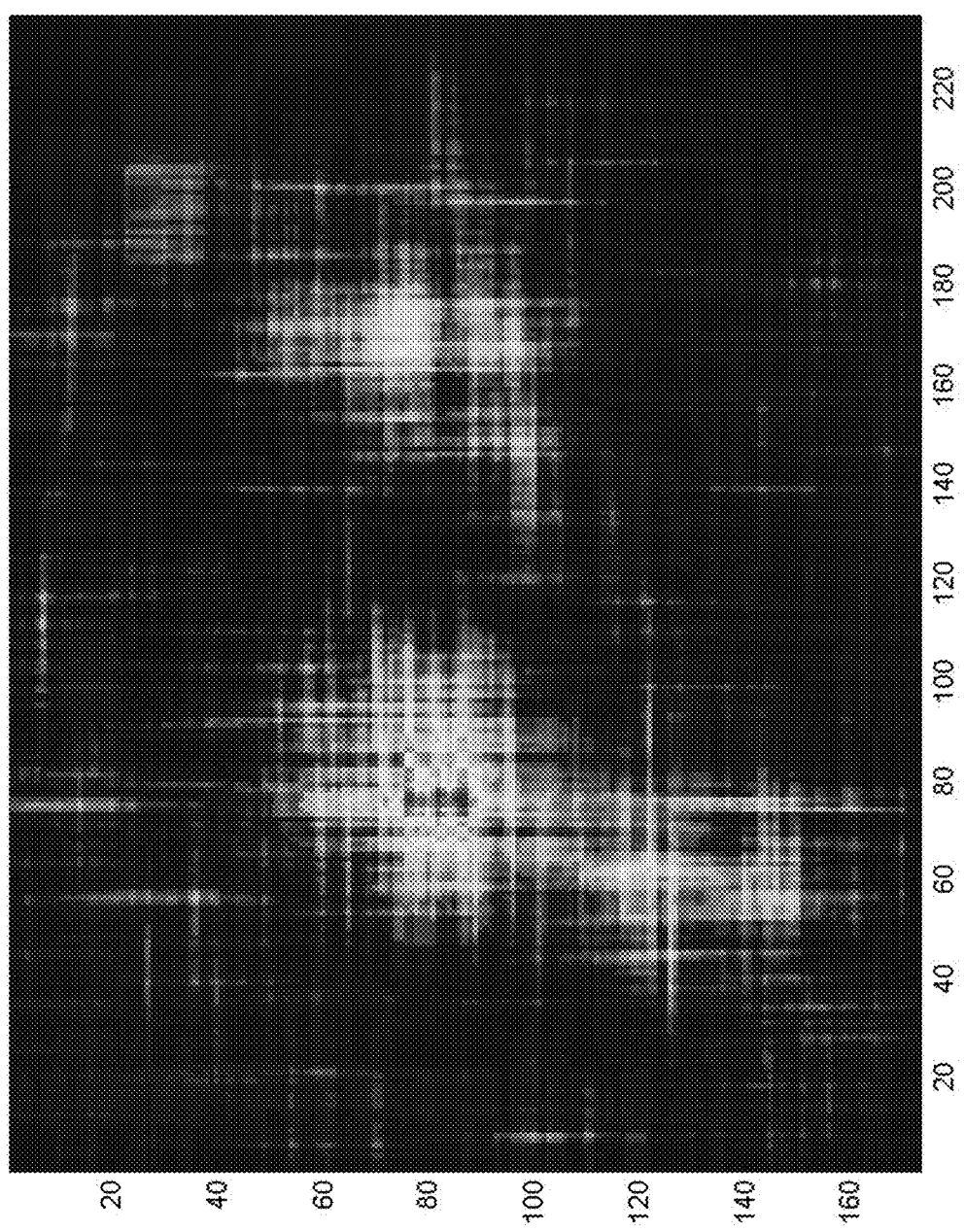
FIG. 4 is a Magnitude Map of the image of FIG. 3.

The magnitude of the peak (dI/dp value) is compared to a threshold peak value deriv_peakthresh (set to 0.2 in FIG. 2). The total number of peaks above deriv_peakthresh are summed together from the row and column vector and the value placed into a new image map called a "Derivative Map" in the coordinates corresponding to the center of the derivative kernel (FIG. 3). The sums of the magnitudes of the peaks are placed into a "Magnitude Map" (FIG. 4) for all pixel coordinates.

The algorithm is not limited to vectors in the row and column directions. Any number of vectors at any angle could be used, with the only limit being processing speed. Using more vectors would theoretically improve detection results, since it would capture more of the shape of the butterfly pattern.

The Derivative Map is analyzed to detect pixels that have a number of peaks within the range expected for a butterfly pattern (derivthresh=6 as default). Pixels below the threshold are set to zero. Bright pixels, caused by reflections off surface objects such as rocks and plants, are also masked out of the Derivative Map by multiplying by a mask image. The mask image is made by locating pixels in the original interferometer image that have higher intensity than the maskval parameter and setting pixels at those coordinates to zero in a binary image.

The detection routine uses both the Derivative Map and the Magnitude Map to locate anomalous groups of pixels. The Derivative Map is filtered by setting to zero all pixels corresponding to pixels in the Magnitude Map with lower values than derivthresh. The filtered pixels of the Derivative Map are "clustered" by combining adjacent pixels within a group-radius distance (grprad) distance of 50 pixels/scale-factor into clusters of pixels with measurements of the cluster size, mean magnitude and centroid pixel location. The centroid of the cluster is used to identify the position of a detected anomaly. In order to be counted as detections, clusters need to pass a size threshold (minpix and maxpix) and distance threshold, where the cluster pixels must be at least a distance of one-half of the derivative kernel size from pixels that are masked out. A small fraction of pixels in a cluster may fall within masked areas, determined by the maskfraction value. Clusters that meet these requirements are added to a detection list structure file that includes the centroid pixel location, the coordinates of each pixel in the cluster and size and magnitude information of the cluster. This detection list is the primary output data structure for the entire system.

Figure 5:
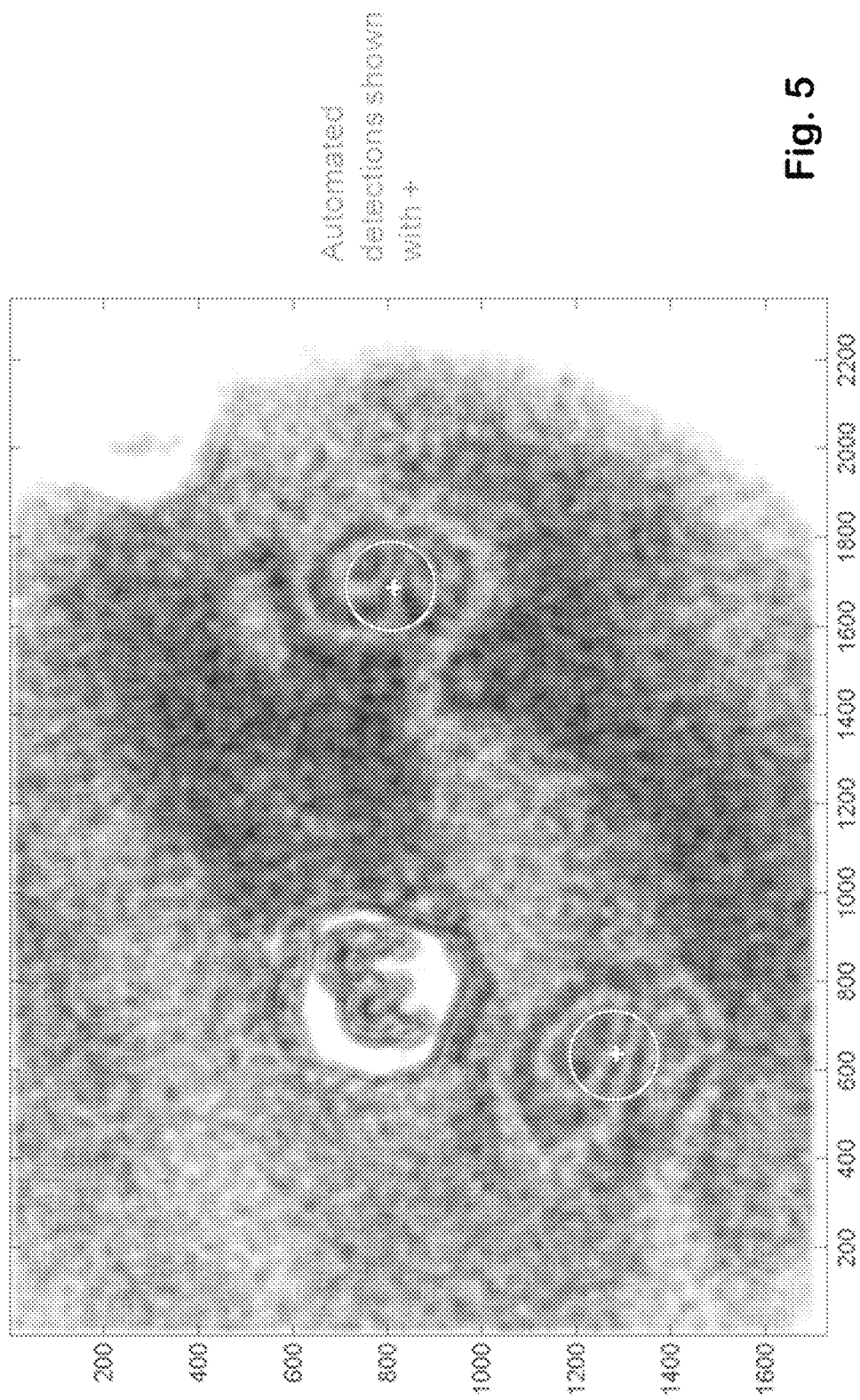
FIG. 5 shows anomaly detection in an image pre-processed as in FIG. 1.

A sample result from automated target detection is shown in FIG. 5, with the centroid coordinates of two clusters displayed as a plus sign within a small circle. This type of visualization can be used to direct a human operator's attention to anomalies. Alternatively, the detection list with the location of anomalies could be used to directly control a machine or robot capable of unearthing or disabling the buried object.

It should be understood that modifications and variations of the system described above are possible without departing from the invention defined by the claims below.

What is claimed is:

1. A method of locating objects buried under ground, comprising steps of:
   insonifying the ground with a system which can distinguish buried objects,
   forming a raw image of the ground with a laser interferometer,
   preprocessing the raw image with a computer to form a preprocessed image comprising a plurality of pixels arranged in rows and columns,
   processing the pixels in the rows and columns of the preprocessed image with a computer, wherein the processing step comprises calculating one or more derivatives having one or more peaks,
   comparing magnitudes of the one or more peaks to a threshold peak value,
   mapping the one or more derivatives and the one or more peaks having a magnitude above the threshold peak value to create a derivative map,
   analyzing the derivative map to detect a cluster of pixels that have a number of peak within a range for a defined pattern,
   detecting anomalous signatures in the derivative map based on the cluster of pixels,
   identifying a location of a centroid pixel of the cluster of pixels which correlates to a location of the detected anomalous signature, and
   demarcating locations on said preprocessed image that correspond to said anomalous signatures.

2. The method of claim 1, wherein the step of preprocessing comprises filtering the raw laser interferometer image with a Gaussian blur filter.

3. The method of claim 1, wherein, in the processing step, derivatives are calculated along pixel vectors extending in only two different directions, and said derivatives are added to produce a magnitude map.

4. The method of claim 3, wherein first derivatives are calculated along the pixel vectors that extend in rows of pixels and other first derivatives are calculated along the pixel vectors that extend in columns of pixels, the pixel vectors that extend in the rows of pixels has a length that is equal to a length of the pixel vectors that extend in the columns of pixels.

5. The method of claim 3, wherein only derivative values above a predetermined threshold are added to produce the magnitude map.

6. The method of claim 3, further comprising a step of masking to eliminate derivative values at points exceeding a predetermined maximum brightness on the preprocessed image.

7. The method of claim 1, wherein said objects are land mines and the locations on said preprocessed image that correspond to said anomalous signatures are demarcated with at least one of a plus sign and a circle, and the cluster of pixels is added to a detection list structure file that includes the location of the centroid pixel of the cluster of pixels.

8. A system for detecting land mines, said system comprising
an apparatus for insonifying a target area,
a laser interferometer for producing a raw laser interferometer image obtained from said insonified area, the raw laser interferometer image comprising pixels arranged in rows and columns,
a Guassian blur filter for filtering the raw laser interferometer image to produce a preprocessed image,
a device for processing the preprocessed image by calculating one or more derivatives having one or more peaks,
a device for mapping the one or more derivatives and the one or more peaks, to create a derivative map,
a device for analyzing the derivative map to detect pixels that have a number of peaks within a threshold range of a defined pattern, pixels below the threshold range are set to zero,
a device for detecting a cluster of pixels that have a number of peaks within a range for a defined pattern, the cluster of pixels corresponds to an anomalous signature in the derivative map, and
a device for identifying a location of a centroid pixel of the cluster of pixels, the location of the centroid pixel correlates to a location of the anomalous signature, and
a device for demarcating locations coordinates of the centroid pixel of the cluster of pixels on the preprocessed image that correspond to said anomalous signatures so as to direct attention to said anomalous signatures.

* * * * *